May 10, 1966 H. R. HEGGEN 3,250,977
SYSTEM FOR DRIVING A STEPPING MOTOR AT VARYING SPEEDS
Filed March 29, 1963
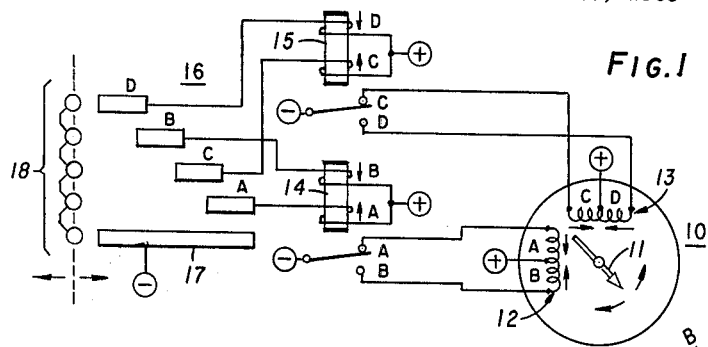
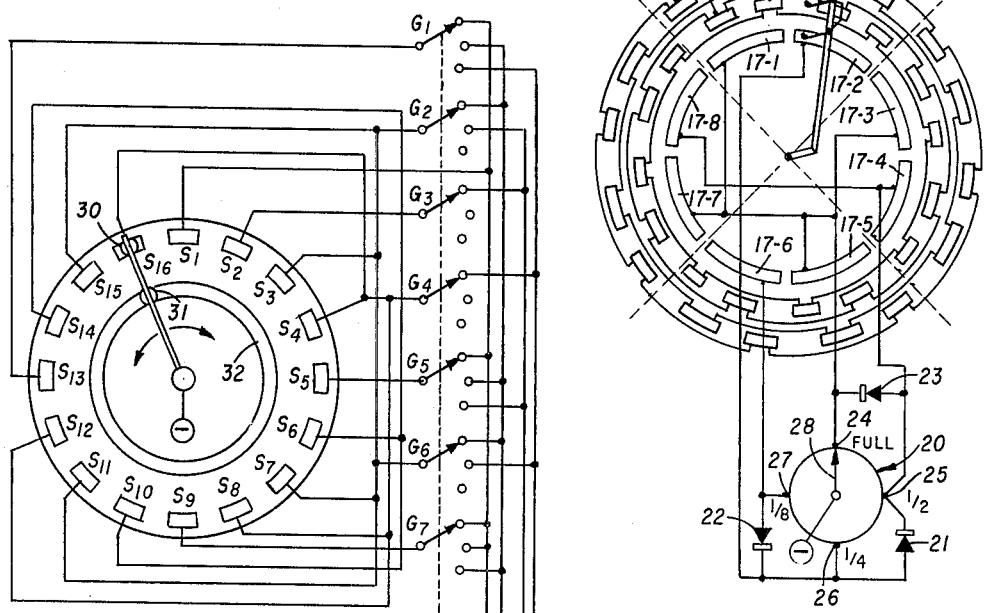
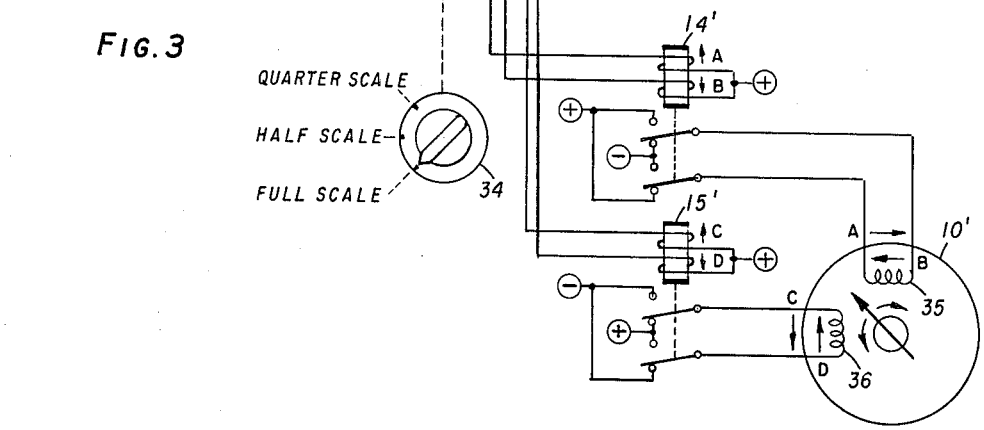

United States Patent Office 3,250,977
Patented May 10, 1966

3,250,977
SYSTEM FOR DRIVING A STEPPING MOTOR
AT VARYING SPEEDS
Henry R. Heggen, Sunland, Calif., assignor to The Bendix Corporation, North Hollywood, Calif., a corporation of Delaware
Filed Mar. 29, 1963, Ser. No. 268,972
3 Claims. (Cl. 318—254)

This invention relates to motion-controlling systems involving a stepping motor of the type in which pulses successively applied thereto cause it to progress in one direction or the other in uniform angular increments.

There are situations in which it is desirable to cause one or more secondary shafts or other movable devices to follow the movement of a master movable device, sometimes through the same distance as the master device, sometimes through a lesser distance that is harmonically related thereto; i.e., a submultiple of the movement of the master device. Obviously this can be done mechanically by a suitable gear box. However a gear box derives its energy from the input shaft and cannot deliver more, indeed not as much, power as is put into it, and does not lead itself to remote positioning of the secondary units relative to the master unit.

An object of the invention is to provide a simple and inexpensive electrical apparatus for driving one or more secondary motors from a master drive element through harmonically related adjustable distances.

Another object of this invention is to provide a positive bi-directional, selective speed step motor drive system.

Another object is to provide a simple apparatus for driving one or more secondary motors from a master drive element through harmonically related adjustable distances in which the secondary motors are independently powered and can be more powerful than the master drive element.

Other more specific objects and features of the invention will be apparent from the description to follow with reference to the drawing in which:

FIG. 1 is a schematic diagram showing an elementary version of the invention.

FIG. 2 is a schematic diagram showing a simplified rotary commutator and associated circuit that may be employed in the system of FIG. 1.

FIG. 3 is a schematic diagram showing a modified system in which the commutator is further simplified.

In FIG. 1 there is indicated schematically a well-known type of stepping motor 10 in which a rotor indicated by an arrow 11, which may be a permanent magnet, is controlled by two stator windings 12 and 13 each of which produces a field perpendicular to the other. Each winding has a center tap connected to the positive side of an energized circuit so that connection of one end of the winding to the negative side of the energizing circuit produces a field in one direction, and connection of the other end of the winding to the negative side of the energizing circuit produces a field in the opposite direction. The half windings will be referred to as windings A, B, C and D respectively, and an arrow adjacent each shows the direction in which the rotor arrow will point when controlled by energization of that winding. If one of the windings A and B and one of the windings C and D are energized simultaneously, the rotor direction will be determined by both. As shown, windings A and C are energized, and the rotor arrow 11 points to 135° (using clock directional nomenclature from 0° at the top of the drawing). One or the other of windings A and B and one or the other of windings C and D is always energized in the circuit shown, because each related pair is respectively energized over the back and front contacts of a separate bistable relay, the armature of which remains in the last-operated position until it is oppositely energized.

Thus winding A is energized over the front contact and winding B is energized over the back contact of a relay 14 which has a winding B which actuates the armature to close on the B contact and a winding A which actuates the armature to close on the A contact. Similarly, winding C is energized over the front contact and winding D is energized over the back contact of a relay 15 having a pair of windings C and D respectively which when energized move the armature to energize the motor windings C and D respectively.

The relays 14 and 15 are sequentially energized over a contact track system 16 which comprises a continuous segment 17 connected to the negative terminal of a source (the positive terminal of the same source being connected to the relay windings A, B, C and D). The other ends of the relay windings are connected to short segments which, for convenience, are identified as A, C, B and D respectively because segment A is connected to winding A of relay 14, segment C is connected to winding C of relay 15, segment B is connected to winding B of relay 14, and segment D is connected to winding D of relay 15. Five interconnected brushes 18 move to successively connect the long or bus segment 17 to the short segments D, B, C and A in the order named, to connect the negative terminal of the power source to one of the other of the relay windings A, B, C, D.

If it is assumed that the brush assembly 18 periodically moves from left to right across the segments, the last segments energized were segments C and A, which actuated the relays 14 and 15 into the position shown, in which relay 15 energizes the motor winding C to urge the rotor 11 toward the 90° position, and the relay 14 energizes the motor coil A to urge the rotor toward the 180° position. The rotor therefore assumes the position midway between 3 and 6 or the 135° position as shown.

The brush assembly 18 on the next cycle connects the common track 17 to the track segment D to energize relay 15 in the reverse direction in which it causes the energization of the motor coil D toward the 270° position. Since the energized motor coil A is still urging the rotor into the 6 o'clock position, the rotor swings through 90° into the 225° position. The track segment B is next energized to energize the relay 14 in the opposite direction to energize the motor coil B which tends to rotate the rotor into the 360° or 0° position, and the rotor moves 90° into the 315° position. The subsequent energization of segment C energizes coil C of the relay 15. The resultant energization of coils B and C of the motor therefore rotates the rotor another 90° into the 45° position. Movement of the brush assembly to the segment A reverses the relay 14 and completes rotation of the rotor through one complete revolution back into the 135° position.

FIG. 2 shows a further development of the track and brush portion of the system of FIG. 1. The structure has been simplified by reducing the number of tracks containing the short segments from four to two. In FIG. 2, the short segments A and C constitute alternate segments in the same track, and short segments B and D constitute alternate segments in another track. In practice the leads A, B, C and D in FIG. 2 would be connected to the windings of relays 14 and 15 as in FIG. 1; however, in tracing the operation of FIG. 2 it is less confusing to consider the leads A, B, C and D as directly connected to the corresponding motor windings, but remembering that each motor winding would remain energized in one direction until energized in the opposite direction.

The tracks in FIG. 2 have been greatly lengthened to provide eight sets of segments, each the functional equivalent of the single set of FIG. 1. However, unlike FIG.

1, the long segments 17–1, 17–2, etc., are not directly connected to the negative terminal of the source. Instead, they are selectively connectable to the source by a four-position switch 20 and rectifiers 21, 22 and 23, the function of which will appear in the following description of operation.

For operation of the motor 10 (FIG. 1) at maximum speed, the switch 20 in FIG. 2 is set in the "FULL" position, with movable contact 28 on the fixed contact 24. It will be noted that the movable contact is permanently connected to the negative terminal of the source. In this position the negative source is connected to all of the eight long segments as follows: from the contact 24 directly to segments 17–3, 17–5, 17–7 and 17–1; from contact 24 through rectifier 23 to segments 17–4 and 17–8; from contact 24 through rectifiers 23 and 21 to segment 17–2; and from contact 24 through rectifiers 23, 21 and 22 to segment 17–6. Under this condition of operation the motor 10 will be operated through 90° four times, or one revolution, during passage over each long segment, and will be actuated to complete a revolution during passage over every one of the eight long segments. This is full speed operation with the motor 10 completing 8 revolutions for one revolution of the switch brush assembly 18.

If the motor 10 is to be actuated at half speed, the switch 20 is positioned to connect the movable contact 28 with the fixed contact 25. In this position, the negative source is connected from the stationary switch contact 25 directly to segments 17–4 and 17–8 and through rectifiers 21 and 22 to segments 17–1 and 17–6. The result is that every alternate long segment 17–2, 17–4, 17–6 and 17–8 is energized. The motor therefore completes one revolution during passage over each of the four energized segments, and then pauses until the next *alternate* long segment is reached. The overall result is that the motor 10 travels through half the distance that it did under the conditions existent with the switch 20 in the first or "FULL" position on contact 24.

If the switch 20 is actuated to place the movable contact 28 in contact with the fixed contact 26, the motor 10 will be actuated through one-fourth of the full distance in the following manner. Contact 26 is connected directly to long segment 17–2 and indirectly through the rectifier 22 to the long segment 17–6. Hence, during each complete revolution of the brushes the motor 10 will be actuated through only 2 revolutions.

In the last position of switch 20 with the movable contact 28 on the fixed contact 27, the negative terminal of the source is connected only to the long segment 17–6 so that the motor 10 is driven through one revolution only once during each revolution of the brushes.

It will be apparent therefore that, according to the position of adjustment of the switch 20, the motor 10 may be rotated through eight revolutions or four revolutions or two revolutions or only one revolution during each revolution of the brushes.

FIG. 3 shows an alternate system for accomplishing the same general result as the system of FIGS. 1 and 2. The brush and track structure is simplified, consisting of a single row of, for example, 16 short segments $S_1$–$S_{16}$ in a single track in the path of a brush 30, which is connected to a brush 31 which rides on a slip ring 32 connected to the negative terminal of the power source. The commutator structure of FIG. 3 is a simple multiple point contacting switching device without any critical contact spacing requirements.

The segments $S_1$–$S_{16}$ are connected either directly or through a gang switch G to relays 14' and 15' which are analogous to relays 14 and 15 in FIG. 1 and the corresponding currents in the respective windings of relays 14' and 15' cause the same movements of the stepping motor 10' in FIG. 3 as in the stepping motor 10 in FIG. 1. A functionally equivalent, but structurally different, arrangement of the motor windings and the relay contacts relative to the power source is employed; thus in FIG. 3 the two motor windings are not center tapped, and a shift in the position of the armature of each of the relays 14' and 15' simply reverses the direction of current through the entire winding associated therewith.

The control knob 34 of the gang switch has three positions and simultaneously actuates seven gangs $G_1$–$G_7$ respectively into any one of three positions.

In the first position of the knob 34 marked "FULL SCALE" all the segments of the commutator are active. When the brush 30 moves onto the segment $S_1$, winding A of relay 14' is activated over a permanent connection to energize motor winding 35 in direction urging motor 37 in the 90° position. At the same time winding 36 was previously energized in direction D over segment 16 and switch gang $G_4$, so the rotor 37 moves 90° clockwise into the 45° position.

When the brush 30 moves onto segment $S_2$ the brush 30 completes a circuit over switch gang $G_3$ to reverse the current in motor winding 36 from D direction to C direction, to shift the rotor another 90° clockwise to the 135° position. By tracing the circuits from succeeding segments, it will be observed that passage of brush 30 over every 4th segment completes a revolution of the rotor 37 when the gang switch is in the "FULL SCALE" position. In other words, for each revolution of the brush 30, the rotor 37 revolves four times when the switch 34 is in "FULL SCALE" position. When the switch rotates in the opposite direction, the motor rotates in the opposite direction in the corresponding sequence of steps.

With the switch 34 in "HALF SCALE" position the interconnecting segments $S_2$, $S_6$, $S_{10}$ and $S_{14}$ are isolated by switch gang $G_3$; interconnected segments $S_4$, $S_8$, $S_{12}$ and $S_{16}$ are isolated by switch gang $G_4$; segments $S_3$ and $S_{11}$ are transferred by switch gang $G_2$ from winding B of relay 14' to winding C of relay 15'; segment $S_5$ is transferred by switch gang $G_5$ from winding A to winding B of relay 14'; segments $S_7$ and $S_{15}$ are transferred by switch gang $G_6$ from winding B of relay 14' to winding D of relay 15'; segment $S_9$ is still connected over gang $G_7$ winding A of relay 14'; segment $S_{13}$ is transferred by gang $G_1$ from winding A to winding B of relay 14'.

The net result of these circuit changes is shown in the following table.

| Segment Contacted by Brush 30 | Motor Excitation | Motor Rotor Position, degrees |
|---|---|---|
| $S_1$ | A and D | 45 |
| $S_2$ | A and D | 45 |
| $S_3$ | A and C | 135 |
| $S_4$ | A and C | 135 |
| $S_5$ | B and C | 225 |
| $S_6$ | B and C | 225 |
| $S_7$ | B and D | 315 |
| $S_8$ | B and D | 315 |
| $S_9$ | A and D | 45 |
| $S_{10}$ | A and D | 45 |
| $S_{11}$ | A and C | 135 |
| $S_{12}$ | A and C | 135 |
| $S_{13}$ | B and C | 225 |
| $S_{14}$ | B and C | 225 |
| $S_{15}$ | B and D | 315 |
| $S_{16}$ | B and D | 315 |

Therefore the motor 10' operates through half the full distance, or two revolutions driving one revolution of the brush 30. When the switch 34 is in the "QUARTER SCALE" position, only segments $S_1$, $S_5$, $S_9$ and $S_{13}$ are effective to operate the relays 14' and 15', and they energize the motor windings in the same sequence as before, to cause the rotor to complete one revolution during one revolution of the brush 30. The following table shows only the active positions of the brush 30.

| Segment Contacted by Brush 30 | Motor Excitation | Motor Rotor Position, degrees |
|---|---|---|
| S₁ | D and A | 45 |
| S₅ | C and A | 135 |
| S₉ | C and B | 225 |
| S₁₃ | D and B | 315 |

Therefore by selection of position of the "electronic gear shift" control the speed of the controlled motor can be changed to any of several harmonically related speeds without change of any mechanical components of the system.

Although for the purpose of explaining the invention a particular embodiment thereof has been shown and described, obvious modifications will occur to a person skilled in the art, and I do not desire to be limited to the exact details shown and described.

I claim:

1. In a variable-distance drive system:

a stepping motor having a stator energizable by pulses in a plurality of modes and a rotor differently responsive to each different mode of energization to move into a different postion such that successive pulses in a predetermined order of modes rotate said rotor incrementally in a direction a distance proportional to the number of pulses, said motor having a separate energizing circuit for each mode of operation;

an energizing source;

bistable relay means, one for each of said energizing circuits, operable for sequentially applying pulses from said source to said separate energizing circuits in such order as to rotate said rotor incrementally in said direction a fixed distance in response to application thereof of a fixed number of pulses;

and timing means comprising a plurality of segments and means for successively applying potential pulses to them in fixed order for actuating said bistable relay means to directly energize its associated winding, each of said bistable relay means remaining in its last operated condition until reactivated into its other condition by said timing means;

said switching means including, in addition to said bistable relay means, scale factor switching means adjustable into a plurality of positions for variably connecting said segments of said timing means to said bistable relay means in such fashion that in one position of the scale factor switching means successive segments of said timing means are connected to different ones of said bistable relay means whereby application of every pulse to a segment of said timing means produces an increment of movement of said stepping motor means, and whereby said scale factor switching means in another position thereof isolates regularly spaced segments of said timing means from said relay means and connects the remaining, spaced-apart segments of said timing means to said relay means in such fashion that said relay means are energized in the same sequence as before but at slower intervals, whereby said stepping motor is driven at a speed related to but less than the speed of said timing means.

2. In a variable-distance drive system:

a stepping motor having a stator energizable by pulses in a plurality of modes and a rotor differently responsive to each different mode of energization to move into a different position such that successive pulses in a predetermined order of modes rotates said rotor incrementally in a direction a distance proportional to the number of pulses, said motor having a separate energizing circuit for each mode of operation;

an energizing source;

bistable switching means operable for sequentially applying pulses from said source to said separate energizing circuits in such order as to rotate said rotor incrementally in said direction a fixed distance in response to application thereof of a fixed number of pulses;

timing means comprising a plurality of segments and means for successively applying potential pulses to them in fixed order for actuating said bistable means, each of said bistable means remaining in its last operated condition until reactivated into its other condition by said timing means;

said switching means including, in addition to said bistable means, scale factor switching means adjustable into a plurality of positions for variably connecting said segments of said timing means to said bistable means in such fashion that in one position of the scale factor switching means successive segments of said timing means are connected to different inputs of said bistable means whereby application of every pulse to a segment of said timing means produces an increment of movement of said stepping motor means, and whereby said scale factor switching means in another position thereof isolates regularly spaced segments of said timing means to said bistable means from said bistable means and connects the remaining, spaced-apart segments of said timing means to said bistable means in such fashion that said bistable means are energized in the same sequence as before, but at slower intervals whereby said stepping motor is driven at a speed related to but less than the speed of said timing means.

3. In a variable-distance drive system:

a stepping motor having a stator energizable by pulses in a plurality of modes and a rotor differently responsive to each different mode of energization to move into a different position such that successive pulses in a predetermined order of modes rotate said rotor incrementally in a direction a distance proportional to the number of pulses, said motor having a separate energizing circuit for each mode of operation;

an energizing source;

switching means operable in a direction for sequentially applying pulses from said source to said separate energizing circuits in such order as to rotate said rotor incrementally in said direction a fixed distance in response to application thereto of a fixed number of pulses, and comprising relatively rotatable brush and track structures, the track structure comprising a plurality of groups of segments successively traversed by said brush structure, each group of segments comprising a master segment and a plurality of pulse segments operatively associated with said motor energizing circuits, said brush structure during its traverse of each section successively connecting the master segment to the pulse segments of that group;

said switching means also including means for selectively connecting said source either to all of said master segments or to a symmetrically spaced lesser number of said master segments, whereby said stepping motor is driven at a speed related to but less than the speed of said brush structure relative to said track structure.

References Cited by the Examiner

UNITED STATES PATENTS

| 2,725,512 | 11/1955 | Padron | 318—254 |
| 3,005,941 | 10/1961 | Heggen | 310—49 |
| 3,042,847 | 7/1962 | Welch | 318—254 |
| 3,041,516 | 6/1962 | Bailey | 310—49 |

ORIS L. RADER, *Primary Examiner.*

G. SIMMONS, S. GORDON, *Assistant Examiners.*